(12) United States Patent
Foucault et al.

(10) Patent No.: US 7,685,828 B2
(45) Date of Patent: Mar. 30, 2010

(54) ELECTRICITY GENERATION IN A TURBOMACHINE

(75) Inventors: Alain Auguste Jacques Foucault, Le Chatelet en Brie (FR); Etienne Juchauld, Samois sur Seine (FR); Arnaud Jean-Marie Pierrot, Le Mee sur Seine (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 12/200,266

(22) Filed: Aug. 28, 2008

(65) Prior Publication Data

US 2009/0058089 A1  Mar. 5, 2009

(30) Foreign Application Priority Data

Aug. 30, 2007  (FR)  ................................. 07 06072

(51) Int. Cl.
*F02C 6/00* (2006.01)
(52) U.S. Cl. ........................................ 60/801; 60/226.1
(58) Field of Classification Search .............. 60/39.181, 60/39.183, 226.1, 801
See application file for complete search history.

(56) References Cited

U.S. PATENT DOCUMENTS 4,796,430 A  1/1989  Malaker et al.
5,269,133 A  12/1993  Wallace
5,376,827 A * 12/1994  Hines ........................... 290/52
6,161,389 A * 12/2000  Sekiya et al. ...................... 62/6
6,832,486 B2 * 12/2004  Care et al. ..................... 60/802
7,514,810 B2 *  4/2009  Kern et al. ..................... 290/52
2009/0056302 A1 *  3/2009  Behaghel et al. ........... 60/39.15

FOREIGN PATENT DOCUMENTS

DE  30 31 872 A2  4/1982
GB  2 041 090 A  9/1980
JP  1-151724  6/1989

* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, L.L.P.

(57) ABSTRACT

A turbomachine comprising at least one Stirling cycle thermal engine which is mounted at the end of a radial arm of the exhaust casing and comprises a working chamber located outside the primary and secondary flows, a displacing piston associated with a moving element of an energy generation system, and two exchangers, heating and cooling, formed in parts of the radial arm respectively intercepting the primary flow and the secondary flow, these two exchangers communicating with each other and with the working chamber for the circulation of a working fluid.

13 Claims, 4 Drawing Sheets

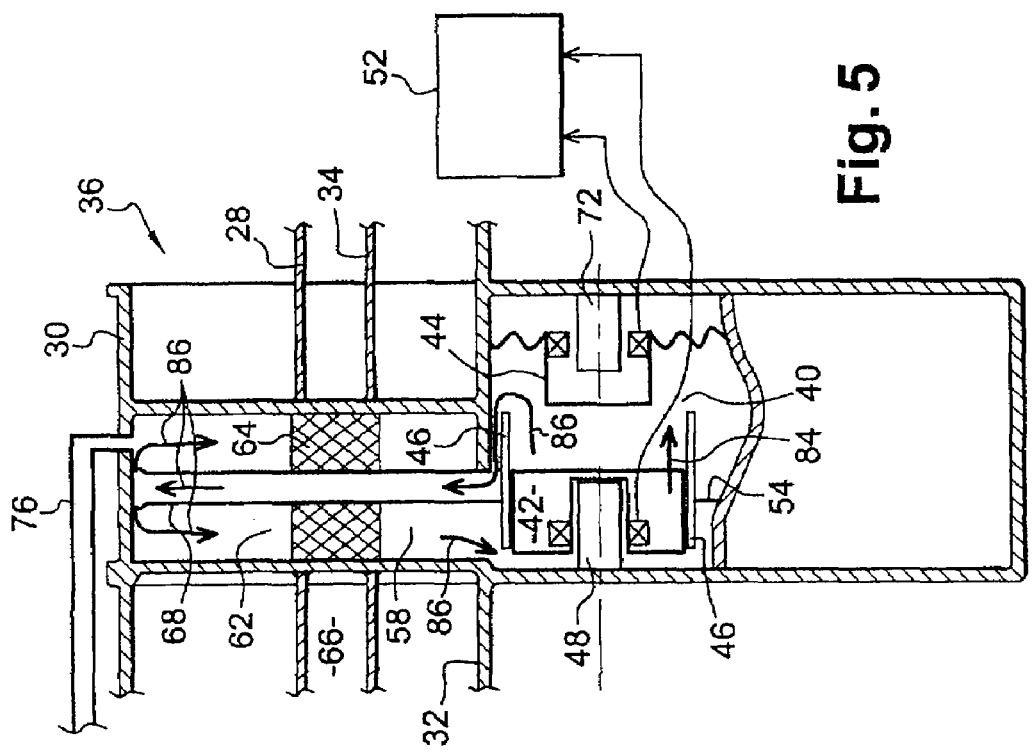
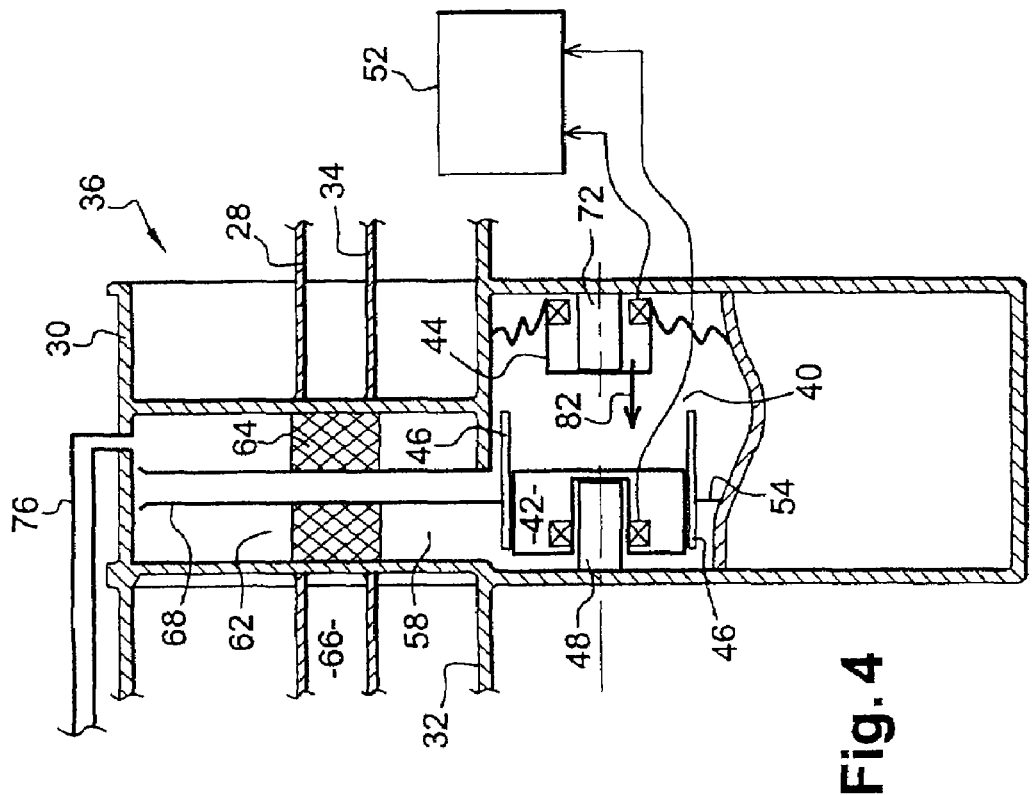

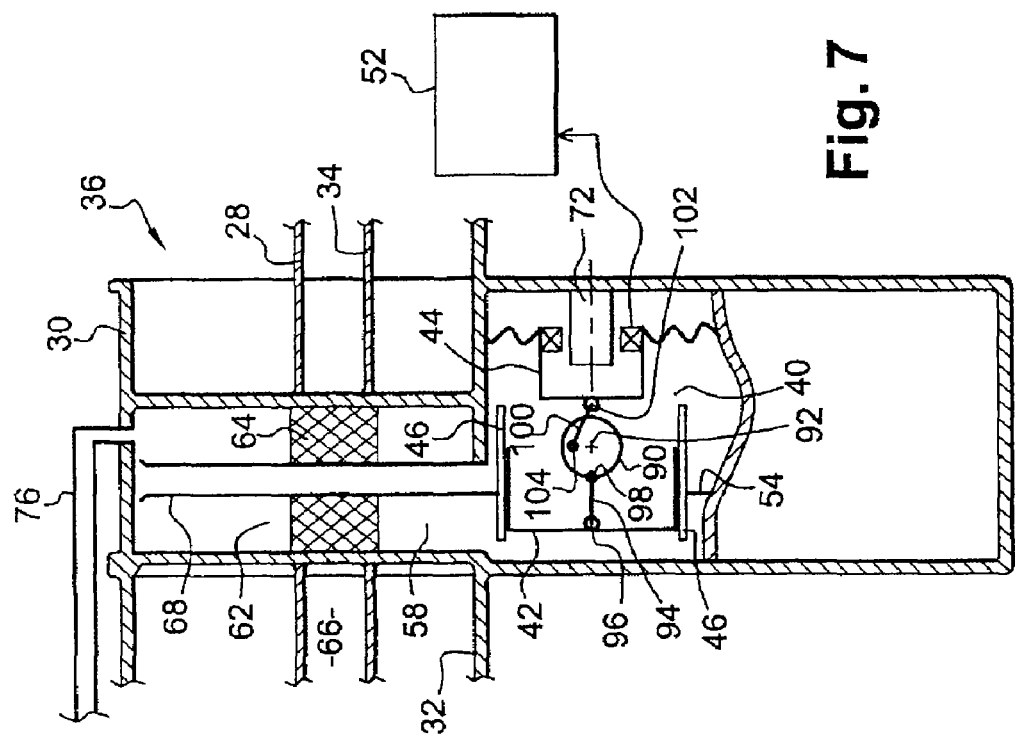
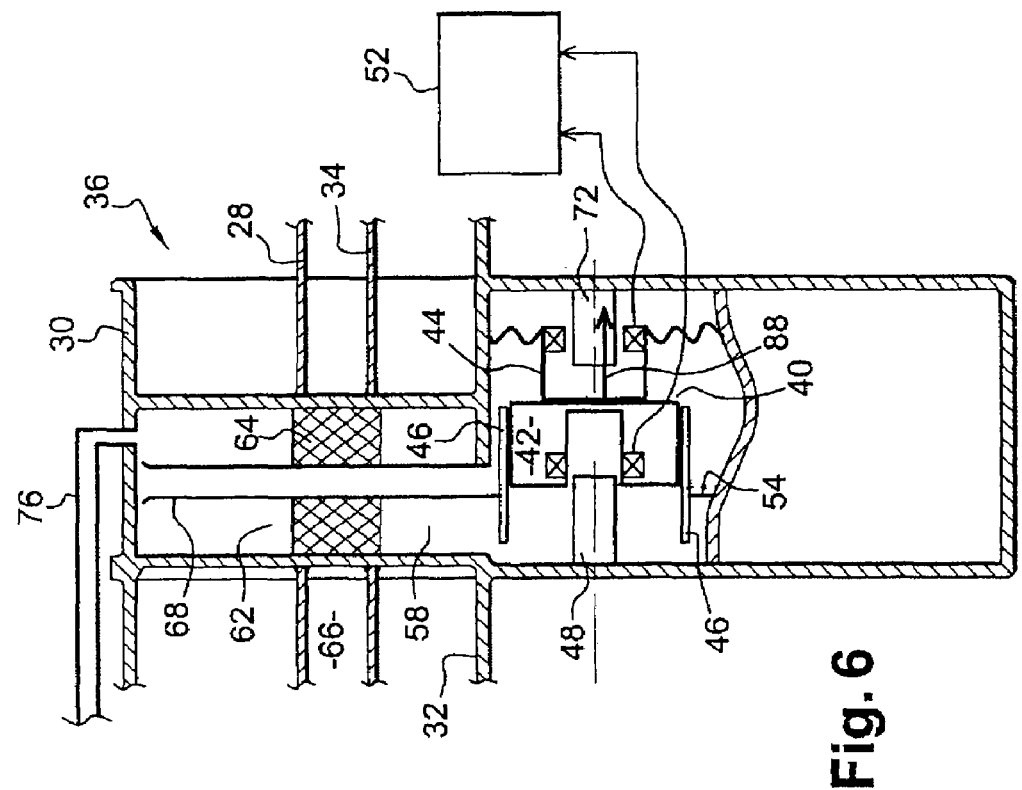

ELECTRICITY GENERATION IN A TURBOMACHINE

BACKGROUND OF THE INVENTION

The present invention relates to electricity generation in turbomachines, in particular dual-flow turbomachines, such as airplane jet engines.

The electrical power supply for airplanes is generally provided by electromechanical generators incorporated in the jet engines of these airplanes and driven by power taken from high-pressure compressors of the jet engines.

Since the mechanical power tapped in this way is not used for propulsion, this type of electrical generator substantially lowers the efficiency of the jet engines.

DESCRIPTION OF THE PRIOR ART

Already known is a method of driving an electrical generator by means of an engine operating according to a Stirling cycle, but such a generator is a heavy machine designed to operate in co-generation mode with heating means for residential or office buildings as described, for example, in the document GB-A-2 391 299, and is not suited to use on an aeronautical turbomachine. The main aim of the invention is to provide a simple, economical and effective solution to the problem of electricity generation in dual-flow turbomachines, making it possible to overcome the drawbacks of the known art.

Another aim of the invention is the generation of electricity in a turbomachine according to a cogeneration principle, exploiting the thermal energy dissipated in the exhaust gases.

Yet another aim of the invention is the integration of a Stirling engine in a turbomachine in a way that minimizes the increase in the total weight of the turbomachine and the bulk of the Stirling engine and associated means of generating electrical energy.

SUMMARY OF THE INVENTION

The invention to this end proposes a dual-flow turbomachine, comprising an exhaust casing linked by radial arms to coaxial cylindrical walls delimiting flow arteries for a primary flow of hot exhaust gases and for a secondary flow of cold air, wherein said turbomachine is equipped with at least one Stirling cycle thermal engine mounted at the end of a radial arm and comprising two thermal exchangers, for heating and cooling respectively a working fluid, which are formed in parts of the radial arm respectively intercepting the primary flow and the secondary flow.

The Stirling cycle thermal engine, commonly called "Stirling engine" or hot air engine, makes it possible to exploit the temperature difference between the primary flow of exhaust gas and the secondary flow of cold air to generate mechanical energy, which can be converted into electrical energy. This type of engine is characterized by a very good efficiency which can reach 40% as a theoretical maximum, with very good reliability and long life.

The theoretical operating cycle of such an engine comprises four successive phases: an isochoric heating phase followed by an isothermic expansion phase for the working fluid, then an isochoric cooling phase followed by an isothermic compression phase for the working fluid.

The Stirling engine also comprises a working chamber located outside the primary and secondary flows and in which is arranged a displacing piston associated with a moving element of an energy generation system, the working chamber communicating with the exchangers for the circulation of the working fluid.

Advantageously, the heating and cooling exchangers are linked by a regenerator intended to accumulate thermal energy during the cooling phase of the Stirling cycle and deliver thermal energy during the reheating phase.

This regenerator is an exchanger that forms a thermal accumulator which makes it possible to increase the efficiency of the Stirling engine.

According to another characteristic of the invention, the regenerator is housed in a part of the radial arm located between the flow arteries of the primary flow and of the secondary flow, in order for the thermal exchanges between the working fluid and the regenerator not to be disturbed by the primary and secondary flows.

For similar reasons, the working chamber is preferably arranged at the radially internal end of the radial arm and radially inside the inner cylindrical wall delimiting the flow artery of the primary flow.

According to a preferred embodiment of the invention, the displacing piston is arranged in such a way as to divide in a seal-tight manner the working chamber into two zones, the first of which is linked to the heating chamber and the second of which is linked to the cooling exchanger by a thermally insulated duct passing through the heating exchanger and the regenerator.

This arrangement makes it possible to reduce the bulk of the device while providing a space for the regenerator.

In a first embodiment, the displacing piston comprises a cylindrical cavity extending in the direction of displacement of the piston and inside which is mounted a fixed permanent magnet, the displacing piston being provided with a winding of electrical wire arranged around the cylindrical cavity and linked to an electrical interface to drive the displacing piston.

In another embodiment, the working chamber comprises a wheel linked to the moving element of the energy generation system and to the displacing piston by link rods.

Advantageously, the Stirling engine is sealed and filled with a pressurized inert gas such as helium. As a variant, it can comprise a pressurized gas inlet, for example into the working chamber or into one of the exchangers, so as to increase the pressure of the working fluid and, consequently, the efficiency of the Stirling engine.

The radial arm advantageously comprises thermal exchange fins on its outer and/or inner surface located in the flow arteries of the primary and secondary flows.

In the preferred embodiment of the invention, the moving element of the energy generation system is supported by an elastic return means fixed in the working chamber and comprises a cylindrical cavity extending in its direction of displacement and inside which is positioned a fixed permanent magnet, the moving element being provided with a winding of electrical wire arranged around the cylindrical cavity and linked to an electrical interface to enable mechanical energy to be converted into electrical energy.

The invention thus makes it possible to generate electricity, to provide the electrical power supply for an airplane for example, and without having to tap useful mechanical energy in the turbomachine.

BRIEF DESCRIPTION OF THE DRAWINGS

The invention will be better understood and other details, advantages and characteristics of the latter will become more clearly apparent from reading the following description, given by way of nonlimiting example, with reference to the appended drawings in which:

FIG. 4 is a view similar to FIG. 3 and illustrates the compression phase of the Stirling cycle;

FIG. 5 is a view similar to FIG. 3 and illustrates the heating phase of the Stirling cycle;

FIG. 6 is a view similar to FIG. 3 and illustrates the expansion phase of the Stirling cycle;

FIG. 7 is a view similar to FIG. 2 and represents a variant of the invention.

DESCRIPTION OF THE PREFERRED EMBODIMENTS

Figure 1:
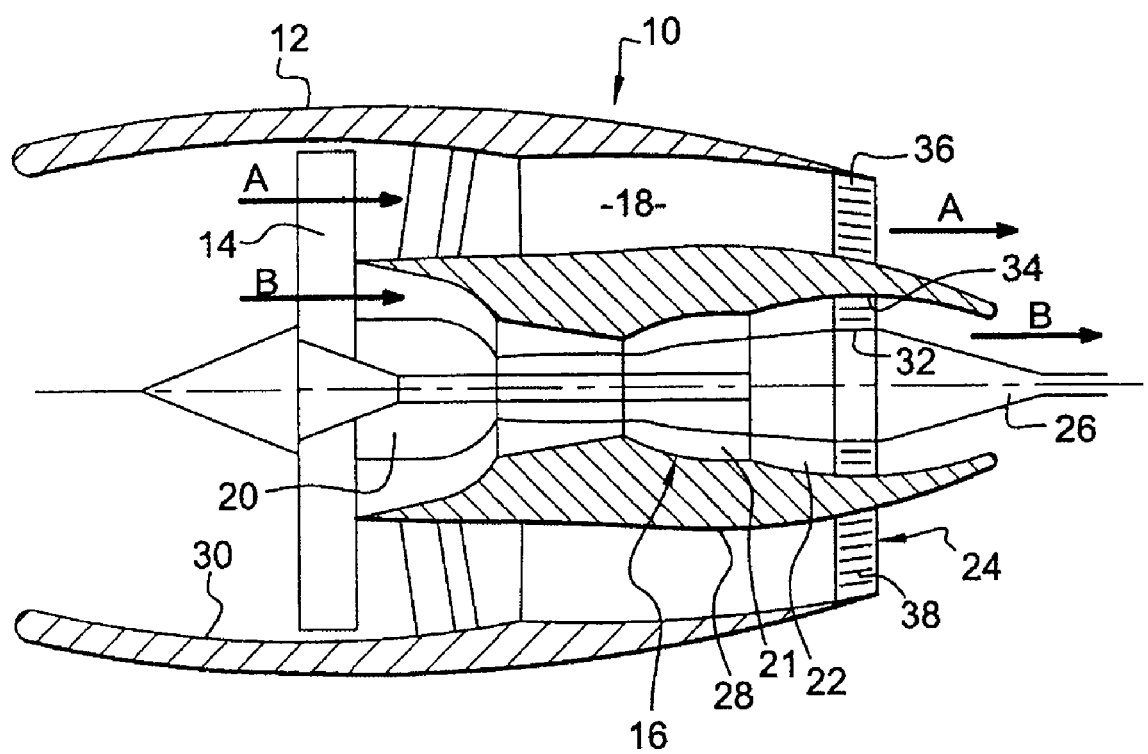
FIG. 1 is a diagrammatic view in axial cross section of a turbomachine according to the invention.

FIG. 1 represents a dual-flow jet engine 10 comprising a nacelle 12 in which a fan wheel 14 is mounted upstream of an engine body 16 mainly comprising, from upstream to downstream, a compressor 20, a combustion chamber 21, a turbine 22, an exhaust casing 24 and an ejection cone 26.

The fan wheel 14 is driven rotation-wise by the turbine 22 of the jet engine, in a manner well known to those skilled in the art. While the engine is operating, the fan 14 generates a secondary flow of air A, which flows backward around the jet engine in a fan duct 18, and which supplies a part of the engine thrust. A portion of the air entering the engine forms a primary flow B which feeds the inlet compressor 20 of the jet engine, then is mixed with fuel in the combustion chamber 21. The combustion gases leaving the combustion chamber drive the turbine 22 then are ejected between two coaxial walls 32, 34 of the exhaust casing 24 and leave the jet engine, flowing along the ejection cone 26.

The fan duct 18 is formed by two substantially cylindrical coaxial walls, respectively inner 28 and outer 30. The inner wall 28 of the fan duct is generally called I.F.D. (Inner Fan Duct) whereas the outer wall 30 is generally called O.F.D. (Outer Fan Duct) and is surrounded by the nacelle 12.

The two coaxial walls, respectively inner 32 and outer 34, of the exhaust casing 24 are linked by structural radial arms 36.

In the example represented, each radial arm 36 of the exhaust casing 24 links the coaxial walls 32, 34 of this casing to the cylindrical walls 28, 30 of the fan duct 18, so that one part of the arm 36 intercepts the primary flow B whereas another part of this arm intercepts the secondary flow A. As a variant, the arm 36 may not extend as far as the outer wall 30.

Fins 38 are advantageously formed on the outer surface of the radial arms 36, level with the parts of these arms that intercept the primary B and secondary A flows, and are diagrammatically represented in FIG. 1. Their operation will be explained below.

Figure 2:
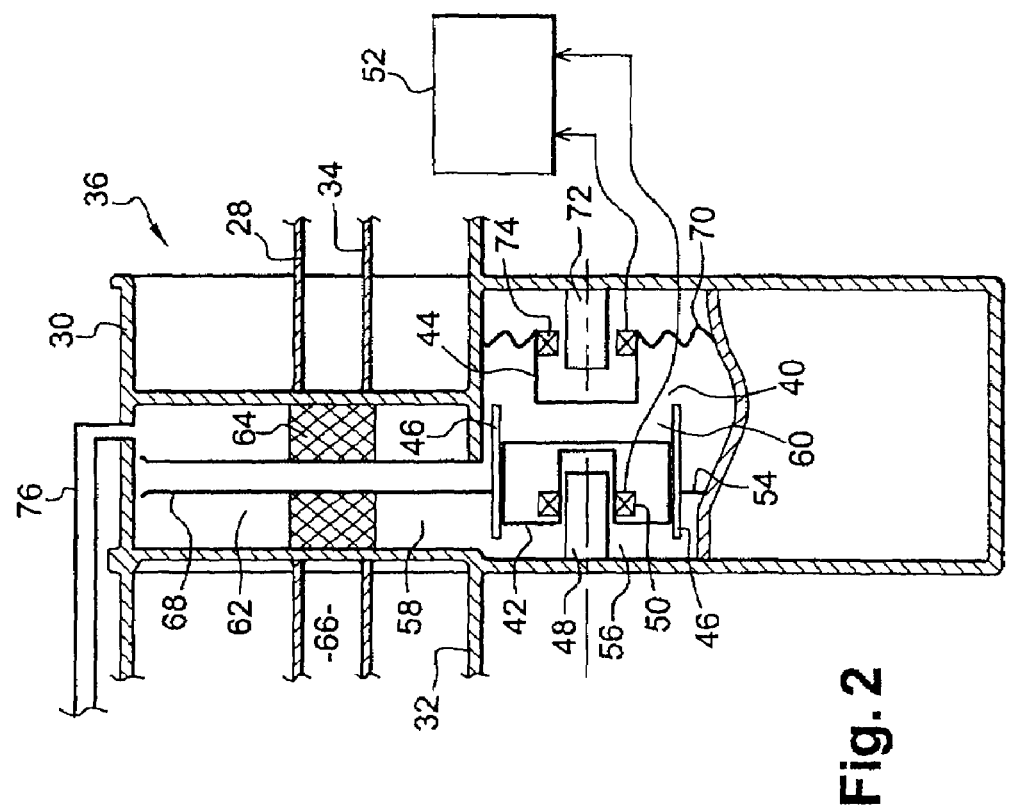
FIG. 2 is a partial diagrammatic view in longitudinal cross section and on a larger scale of an exhaust casing arm of the turbomachine of FIG. 1.

FIG. 2 is a cross-sectional, and larger scale, view of a radial arm 36 of the exhaust casing 24, in which are housed the thermal exchangers of a Stirling cycle engine.

As will be explained below, this engine is designed and arranged to make best use of the available space in the radial arm 36 and exploit the temperature difference between the hot gases of the primary flow B and the cold air of the secondary flow A to generate electrical or mechanical energy.

In a radially internal part relative to the axis of the turbomachine, the Stirling engine comprises a working chamber 40 in which are arranged a displacing piston 42 and a working piston 44 formed by a moving element of an electrical energy generation system.

The displacing piston 42 is housed in a duct 46, for example of cylindrical shape and extending from upstream to downstream, and consists of a part with a form complementing that of the duct, to slide in this duct in a seal-tight manner, preventing the flow of air around the piston in the duct. The displacing piston 42 comprises an open cylindrical cavity, for example on the upstream side of the piston, and with an axis parallel and preferably aligned with the axis of the piston, in which is mounted a cylindrical magnet 48 fixed to a wall of the working chamber 40. The piston also comprises an electrical winding 50 positioned around the cavity and intended to enable the piston 42 to be electromagnetically driven in a straight line in its duct 46, this winding being linked to an electrical interface 52 comprising, for example, a phase-shifting circuit.

The duct 46 of the displacing piston 42 is mounted in an orifice of a form corresponding to a plate 54 linked to the walls of the radial arm 36 in such a manner that the displacing piston 42 and the plate 54 divide, in a seal-tight manner, the working chamber 40 into an upstream zone 56 which communicates with a heating exchanger 58 located in the part of the arm that intercepts the primary flow B, and a downstream zone 60 which communicates with a cooling exchanger 62 positioned in the part of the arm that intercepts the secondary flow A, located at the radially external end of this arm 36. The working chamber 40 and the heating 58 and cooling 62 exchangers, contain a working fluid, such as air or an inert gas under pressure, that the displacing piston 42 pushes alternately into the heating exchanger 58 or into the cooling exchanger 62, as will be detailed hereinbelow. The arrangement of the heating 58 and cooling 62 exchangers, which are respectively in contact with the primary flow B of hot gases and with the secondary flow A of cold air, provide for an exchange of heat from the primary flow to the working fluid when the latter is in the heating exchanger 58, and from the working fluid to the secondary flow, when the working fluid is in the cooling exchanger 62.

In order to maximize the abovementioned exchanges of heat and as already mentioned with reference to FIG. 1, the radial arm 36 can comprise fins 38 on its outer surface and fins on its inner surface. The outer fins extend in a direction roughly parallel to the axis of the turbomachine so as to best reduce their aerodynamic impact on the flow of the primary and secondary flows. These fins 38 also reinforce the rigidity of the radial arm.

In the embodiment represented in FIG. 2, the Stirling engine also comprises a thermal exchanger 64 of a known type, called regenerator. This regenerator 64 is formed, for example, by foam or metal platelets and is housed in a part of the radial arm located between the flow arteries of the primary and secondary flows, in a space 66 commonly called interartery. This arrangement makes it possible to avoid having the exchanges of heat between the working fluid and this regenerator 64 being disturbed by thermal exchanges with the primary and secondary flows.

It is advantageous for the volumes of the exchangers 58 and 62, which are "dead" volumes, to be minimized and for the thermal exchange surfaces and the volume of the working chamber to be increased.

The working chamber 40 and the cooling exchanger 62 are linked by a thermally insulated link duct 68, which passes through the heating exchanger 58 and the regenerator 64.

Advantageously, the duct 68 also makes it possible to reduce the "dead" volume of fluid contained in the exchangers 58 and 62.

The working chamber 40 comprises an electrical energy generation system of the linear type comprising a hollow cylindrical piston 44 open at the forward end, which is supported by a seal-tight return elastic membrane 70. The assembly formed by the piston 44 and the elastic membrane 70 forms a tightly sealed moving end wall of the working chamber 40, such that a backward or forward displacement of the piston 44 provokes a reduction, respectively an increase, in the volume of the working chamber 40.

A magnet 72, for example of cylindrical form, is fixed to a wall of the working chamber 40 so as to be inserted into the cylindrical piston 44 of the energy generation system. This piston comprises an electrical winding 74 linked to the electrical interface 52 in order to produce a conversion of the mechanical energy of the piston 44 into electrical energy, when the latter is displaced in a straight line along its axis, facing the magnet 72.

The Stirling engine advantageously comprises a pressurized fluid inlet 76, linked to a reserve of inert gas such as helium, with a valve intended for maintenance operations, to increase the pressure of the working fluid and thus improve the energy efficiency of the Stirling engine.

In operation, the Stirling engine describes a thermodynamic cycle comprising four phases respectively represented in FIGS. 3 to 6.

Figure 3:
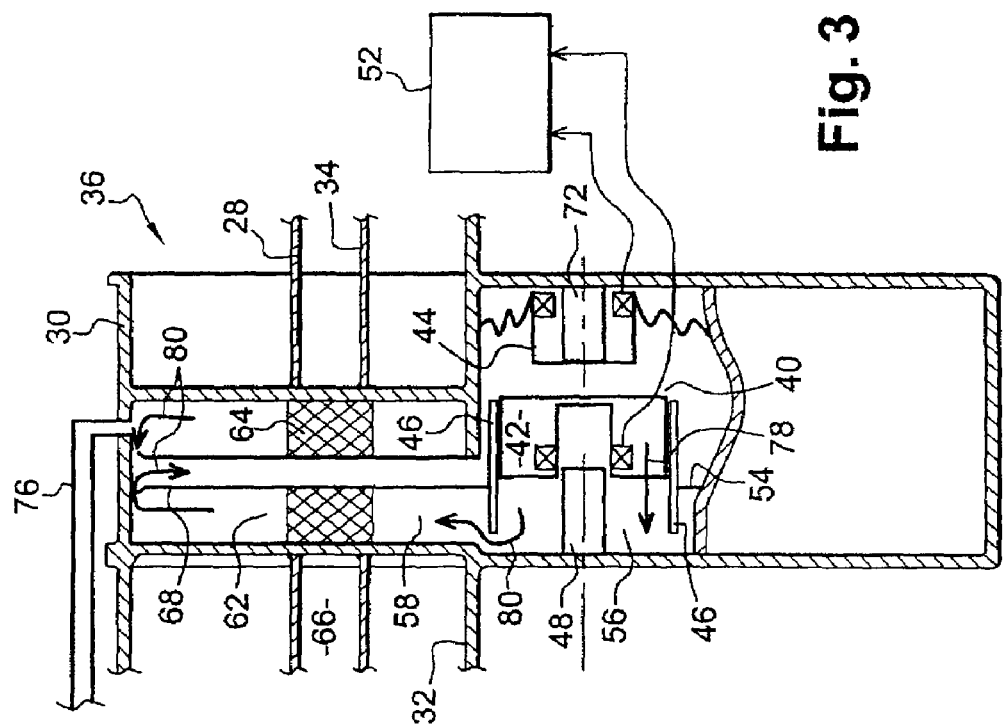
FIG. 3 is a view similar to FIG. 2 and illustrates the cooling phase of the Stirling cycle of the thermal engine incorporated in the exhaust casing arm.

In FIG. 3, the Stirling engine is in an isochoric cooling phase of the working fluid. During this phase, the electrical interface 52 controls a progressive displacement 78 of the displacing piston 42 in a straight line backward, to an extreme position where it comes substantially into abutment against the radial arm 36 (this position of the displacing piston can be seen in FIG. 4). This movement of the displacing piston reduces the volume of the zone 56 of the working chamber, and pushes a major part 80 of the working fluid contained in the heating exchanger 58 through the regenerator 64 and the cooling exchanger 62 to fill the forward part of the working chamber. The working fluid delivers thermal energy to the regenerator 64 on its passage through the latter, and passes through the cooling exchanger 62 to arrive in the forward part of the working chamber.

The working fluid is then subjected to an isothermic compression phase, represented in FIG. 4. The volume occupied by the working fluid diminishes as its pressure increases, because of a backward displacement 82 of the piston 44 of the electrical energy generation system, under the effect of the return elastic membrane 70, to an extreme position of separation of the piston 44 from its magnet 72 (visible in FIG. 5).

The compression phase is followed by an isochoric heating phase for the working fluid, represented in FIG. 5, and during which the electrical interface 52 orders a forward displacement 84 of the displacing piston 42, to an extreme position of separation of this piston from its magnet 48, so as to reduce the volume of the zone 60 of the working chamber, which tends to push at least a part 86 of the working fluid contained in the cooling exchanger 62 through the regenerator 64 and the heating exchanger 58 to the backward part 56 of the working chamber. On its passage inside the regenerator 64, the working fluid receives thermal energy stored in the regenerator, and is therefore reheated on arriving in the heating exchanger 58.

The Stirling cycle ends with an isothermic expansion phase for the working fluid, represented in FIG. 6. During this phase, the volume of the working fluid increases while its pressure decreases. The increase in volume of this fluid provokes a forward displacement 88 of the piston 44 of the energy generation system and of the elastic membrane 70 that supports it, so that the piston returns to the position that it occupies during the cooling phase.

During a Stirling cycle, the piston 44 of the energy generation system therefore completes a forward and backward motion around its magnet 70, which generates electrical energy which can be recovered by means of the electrical interface 52.

The invention therefore makes it possible to generate electrical energy from thermal energy contained in the exhaust gases of a turbomachine, by using a Stirling cycle thermal engine.

FIG. 7 represents another embodiment of the invention, in which the driving of the displacing piston 42 is handled by a mechanical device of a type that is commonplace in Stirling engines. The piston is a U-section piece open at the forward end and the driving device of this piston comprises a wheel 90 which is positioned in the working chamber 40, between the displacing piston 42 and the piston 44 of the energy generation system, and which is mounted to rotate on an axis 92 perpendicular to a median plane of the radial arm 36 and fixed to the walls of this arm. The wheel 90 is linked to the displacing piston 42 by a first link rod 94, the backward end of which is mounted in a yoke 96, or any other similar means, joined to the piston 42 and positioned on its forward face, for example in the middle of this forward face, the forward end of the link rod 94 being mounted in a yoke 98 or similar fixed to the rim of the wheel 90. This wheel is also linked to the piston 44 of the energy generation system by a second link rod 100, the forward end of which is mounted in a yoke 102 or similar joined to this piston 44 and positioned on its backward face, for example in the middle of this backward face, the backward end of the link rod 100 being mounted in a yoke 104 or similar fixed to the wheel 90, for example at a distance from the center of the wheel equal to a quarter of the radius of this wheel. The fixing yokes of the first and second link rods 94, 100 on the wheel 90 form, with the center of the wheel, an angle of approximately 90 degrees so that the movement of the second link rod 100 presents a delay of approximately a quarter cycle relative to the movement of the first link rod 94. The wheel 90 also forms a flywheel of the energy generation system.

The invention is not limited to the generation of electrical energy and it is of course possible to directly exploit the mechanical energy supplied by the piston of the energy conversion system, whether this be to drive an item of equipment in a straight-line reciprocal movement similar to the movement of the piston, or to drive rotation-wise by the use of a connecting rod and wheel or connecting rod and crank system for example, to convert the movement of the piston into rotation movement.

From a general point of view, the invention makes it possible to exploit the thermal energy lost in a turbomachine by following a cogeneration principle. In an aircraft jet engine, for example, the generation of electricity generally entails tapping mechanical energy from the compressor of the jet engine to feed an electromechanical generator. The invention avoids the need for this tapping of useful mechanical energy by using the thermal energy of the exhaust gases, and thus enables the efficiency of the jet engine to be improved, reflected in a specific consumption saving of the order of a percent.

The invention claimed is:

1. A dual-flow turbomachine, comprising an exhaust casing linked by radial arms to coaxial cylindrical walls delimiting flow arteries for a primary flow of hot exhaust gases and for a secondary flow of cold air, wherein this turbomachine is equipped with at least one Stirling cycle thermal engine mounted at an end of a radial arm and comprising two thermal exchangers, for heating and cooling respectively a working fluid, which are formed in parts of the radial arm respectively intercepting the primary flow and the secondary flow.

2. The turbomachine as claimed in claim 1, wherein the two heating and cooling exchangers are linked by a regenerator intended to accumulate thermal energy during a cooling phase of the Stirling cycle and deliver thermal energy during a reheating phase.

3. The turbomachine as claimed in claim 2, wherein the regenerator is housed in a part of the radial arm located between the flow arteries of the primary flow and of the secondary flow.

4. The turbomachine as claimed in claim 1, wherein the Stirling engine comprises a working chamber located outside the primary and secondary flows and in which is arranged a displacing piston associated with a moving element of an energy generation system.

5. The turbomachine as claimed in claim 4, wherein the working chamber is arranged at a radially internal end of the thermal engine.

6. The turbomachine as claimed in claim 4, wherein the displacing piston is arranged to divide in a seal-tight manner the working chamber into two zones, a first of which is linked to the heating exchanger and a second of which is linked to the cooling exchanger.

7. The turbomachine as claimed in claim 6, wherein the second zone is linked to the cooling exchanger by a thermally insulated duct passing through the heating exchanger and the regenerator.

8. The turbomachine as claimed in claim 4, wherein the displacing piston comprises a cylindrical cavity extending in the direction of displacement of the piston and inside which is mounted a fixed permanent magnet, the displacing piston being provided with a winding of electrical wire arranged around the cylindrical cavity and linked to an electrical interface to drive the displacing piston.

9. The turbomachine as claimed in claim 4, wherein the working chamber comprises a wheel linked to the moving element of the energy generation system and to the displacing piston by link rods, to drive the displacing piston.

10. The turbomachine as claimed in claim 4, wherein the Stirling engine comprises a pressurized inert gas inlet into the working chamber or one of the exchangers.

11. The turbomachine as claimed in claim 4, wherein the moving element of the energy generation system is supported by an elastic return means fixed in the working chamber and comprises a cylindrical cavity extending in its direction of displacement and inside which is positioned a fixed permanent magnet, the moving element being provided with a winding of electrical wire arranged around the cylindrical cavity and linked to an electrical interface to enable mechanical energy to be converted into electrical energy.

12. The turbomachine as claimed in claim 1, wherein the radial arm comprises thermal exchange fins on its outer and inner surface located in the flow arteries of the primary and secondary flows.

13. The turbomachine as claimed in claim 1, wherein the radial arm comprises thermal exchange fins on its outer or inner surface located in the flow arteries of the primary and secondary flows.

* * * * *